United States Patent [19]

Patterson

[11] Patent Number: 4,956,966
[45] Date of Patent: Sep. 18, 1990

[54] HEADER FOR A COMBINE HARVESTING MACHINE

[75] Inventor: Roger L. Patterson, Manitoba, Canada

[73] Assignee: MacDon Industries Ltd., Winnipeg, Canada

[21] Appl. No.: 470,640

[22] Filed: Jan. 25, 1990

Related U.S. Application Data

[63] Continuation of Ser. No. 209,901, Jun. 22, 1988, abandoned.

[51] Int. Cl.⁵ .............................................. A01D 47/00
[52] U.S. Cl. ....................................... 56/181; 56/182; 56/208
[58] Field of Search ................ 56/15.9, 181, 182, 183, 56/208; 198/560, 568, 601; 299/64

[56] References Cited

U.S. PATENT DOCUMENTS

| | | | |
|---|---|---|---|
| 3,727,385 | 4/1973 | Twidale et al. | 56/208 |
| 3,921,785 | 11/1975 | Huitink | 198/601 |
| 3,959,957 | 6/1976 | Halls | 56/208 |
| 3,982,383 | 9/1976 | Mott | 56/208 X |
| 4,599,852 | 7/1986 | Kerber et al. | 56/208 X |
| 4,724,661 | 2/1988 | Blakeslee et al. | 56/208 |

FOREIGN PATENT DOCUMENTS 395039  1/1974  U.S.S.R. .
403378  2/1974  U.S.S.R. .
459188  4/1975  U.S.S.R. .
430819  5/1975  U.S.S.R. .
526316  10/1976 U.S.S.R. .
617029  7/1978  U.S.S.R. .

Primary Examiner—Stephen J. Novosad
Assistant Examiner—Terry Lee Melius
Attorney, Agent, or Firm—Adrian D. Battison; Murray E. Thrift; Stanley G. Ade

[57] ABSTRACT

A header frame for a combine includes a mounting frame which is attached to the front end of the feeder housing of the combine and a header frame. The header frame is mounted on the mounting frame by suitable linkage so that it can lift in a vertical direction and also can twist about an axis parallel to the forward direction of the combine to allow the header frame to follow ground contours. A flexible pan is connected between the header frame and the mounting frame to define a lower surface of the header immediately in front of the mouth of the feeder housing with the pan having a forward edge attached to the header frame and a rearward edge attached to the mounting frame with the movement therebetween being accommodated by flexing or sliding of one mounting of the pan. In one arrangement of the header, the conventional auger is replaced by two side drapers and a feed draper with the feed draper being mounted in a manner which allows limited vertical movement away from the pan.

20 Claims, 6 Drawing Sheets

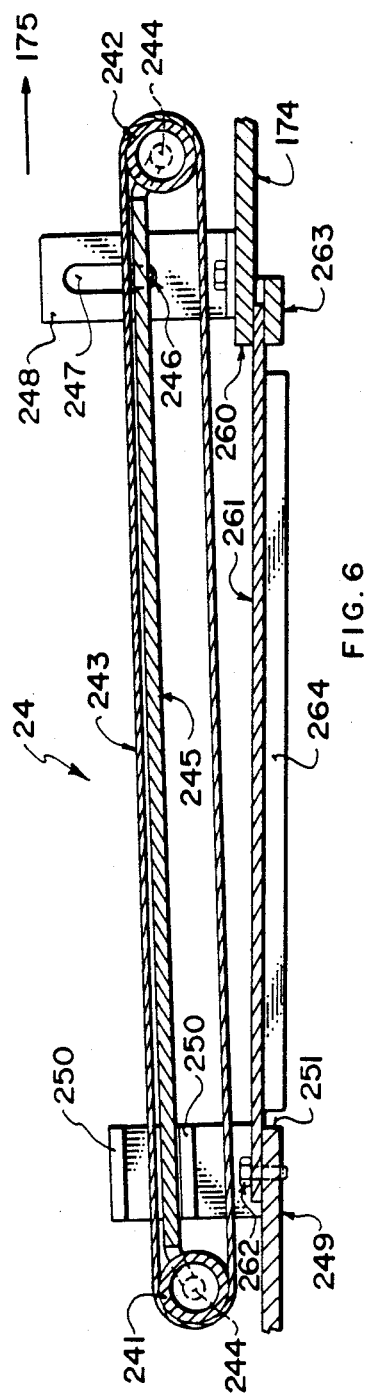
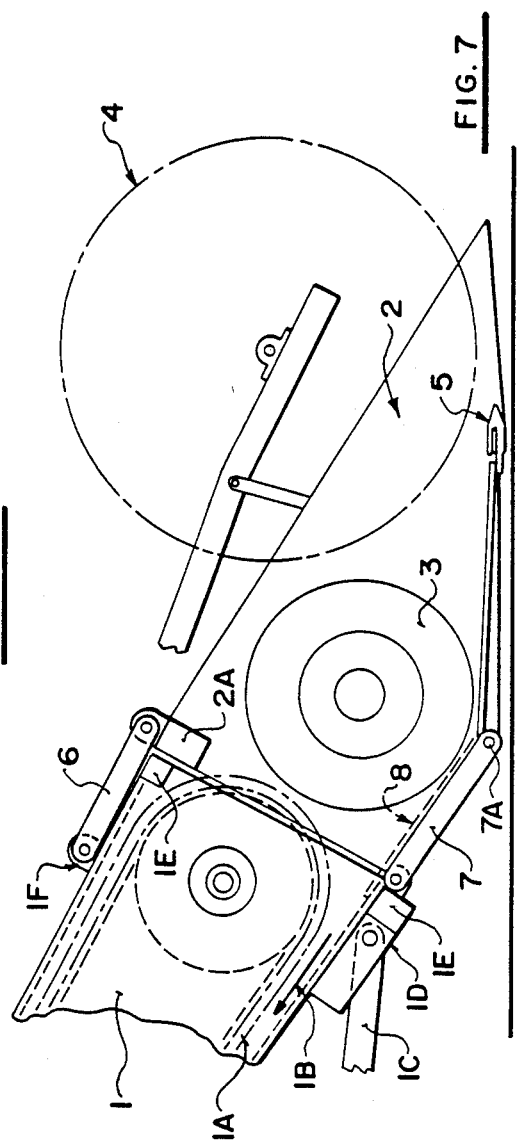
FIG. 6
FIG. 7

HEADER FOR A COMBINE HARVESTING MACHINE

RELATED APPLICATIONS

This application is a continuation of application Ser. No. 07/209,901 filed on 06/22/88, now abandoned.

BACKGROUND OF THE INVENTION

This invention relates to a header for a combine harvesting machine of the type which can be moved in a working direction across a field including a standing crop for cutting of the crop and feeding of the cut crop into the combine harvester for separation of grain.

The combine harvester conventionally comprises a harvester body which is mounted upon ground wheels for transportation of the body across the field. At the front of the body there is provided a feeder housing which is inclined upwardly from a lower end adjacent the ground to an upper end which constitutes the entry of the crop into the combine body. The feeder housing is generally a rectangular tubular body which contains a conveyor arrangement for transporting the cut crop along the tubular body toward the combine.

On the front end of the feeder housing is provided a flange and an attachment mechanism for mounting of a header on the feeder housing. The header can be of various designs suitable for cutting the standing crop over a width generally significantly wider than the combine body, transporting the cut crop inwardly and feeding it through an opening which coincides with the mouth of the feeder housing.

In most cases the header is fixed rigidly to the feeder housing for the purpose of providing an effective seal between the rear opening of the header and the front mouth of the feeder housing. The rigidly mounted header has become conventionally accepted and is to a great extent the only arrangement available for commercial sale.

The rigid mounting of the header on the feeder housing does have a number of problems particularly in that it remains fixed mounted to the combine body regardless of variations in ground level. It is necessary therefore for the operator to be constantly aware of ground level and to raise and lower the header as a whole in dependence upon ground level changes and also to steer the combine so that it approaches ground level changes in the most convenient manner.

In cases where the operator misjudges ground level and causes one end or the other of the header to engage the ground, various consequences can occur. In minor cases the header may gouge into the ground causing soil and stones to be lifted onto the header and to be carried into the combine with the crop. While this is not immediately catastrophic it can cause damage to the delicate equipment over the short or long term. In particularly serious cases the impact can be sufficient to cause damage to the header which may require down time for repair.

Even in cases where no errors are made, the extra effort on the operative by having to constantly vary the height of the header in dependence upon ground level is tiring and leads to reduction in efficiency.

Attempts have therefore been made to enable the header to, to some extent, float relative to the feeder housing. In one particular arrangement, the header is attached to the feeder housing by a circular connection arrangement which allows the header to rotate about an axis centrally of the circular connection. In this way a circular opening in the back of the header co-operates with a circular mouth of the feeder housing enabling the seal therebetween to remain constant despite the rotational movement of the header about the center of the circle. This arrangement is however unsatisfactory in that it requires a specific shape of feeder housing opening and also because it is limiting in the floating movement which can be accommodated.

Swathers which do not require the seal since they do not include a feeder housing but merely deposit the cut crop onto the ground in a swath often include a floating arrangement in which the header of the swather can rise and fall in dependence upon engagement of the header with the ground either by way of skids or by gauge wheels. In many cases the floating movement is provided by way of links which are pivotally connected to the header and to the front of the mounting arrangement with the links allowing the header to lift vertically and the links also having sufficient free play to allow rotation of the header as a whole about an axis forwardly of the direction of movement. This floating action generated by the vertical and pivotal movement has been found to be particularly effective in enabling the header to operate in the most effective manner with the least necessity for control by the operative. However, this arrangement has been considered to be unacceptable in terms of a combine where the seal between the header and the feeder housing is of paramount importance.

It is one object of the present invention, therefore, to provide an improved header for a combine harvester which can be mounted for floating movement on the feeder housing of the combine harvester and yet provides an effective seal between the header and the feeder housing to prevent loss of crop.

According to the invention, therefore, there is provided a header for a combine harvesting machine comprising a header frame, a mounting frame including means for mounting the mounting frame fixedly on the machine for transportation of the header frame in a working direction across a field including a standing crop to be harvested, said header frame including ends thereof extending outwardly to respective side of the mounting frame means mounting said header frame on said mounting frame for limited vertical movement of the header frame relative to the mounting frame and limited pivotal movement of the header frame relative to the mounting frame about an axis generally parallel to the working direction such that each end of the header frame can be lifted independently of movement of the other end of the header frame, a knife arrangement extending transversely across a front edge of the header frame for cutting the standing crop, means defining an opening rearwardly of the mounting frame through which the cut crop is guided to pass, ground engaging means on the header frame arranged to cause said vertical and pivotal movement of the header frame in dependence upon changes in ground height, means for transporting said cut crop inwardly from the ends of the header frame and for feeding said cut crop through said opening, and a flexible pan member arranged underneath said transporting means with a forward end thereof in engagement with said header frame at a position rearwardly of said knife arrangement and a rearward end thereof in engagement with said mounting frame, said vertical movement and pivotal movement of said header frame being accommodated by flexing of said pan.

The transporting means which move the crop from the ends of the header frame inwardly toward the opening can be constituted either by a draper arrangement or by a conventional auger screw arrangement. In both cases, the header frame is basically a rigid structure so that the lifting movement of the ends of the header frame in dependence upon ground height are accommodated by the movement of the header frame relative to the mounting frame.

The pan is preferably of a sheet metal material which is chosen to have sufficient strength to span the extent between its contact with the header frame and its contact with the mounting frame without drooping but is sufficiently flexible amount transverse axis to accommodate the movement of the header frame.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 6 is a cross-sectional view of the lowermost part only of the device a shown in FIG. 4 on an enlarged scale showning the details of the draper and lower pan.

FIG. 7 is a schematic cross-sectional view of an alternative embodiment of the invention of a type using a conventional auger-type feed arrangement.

In the drawings like characters of reference indicate corresponding parts in the different figures.

DETAILED DESCRIPTION

Figure 1:
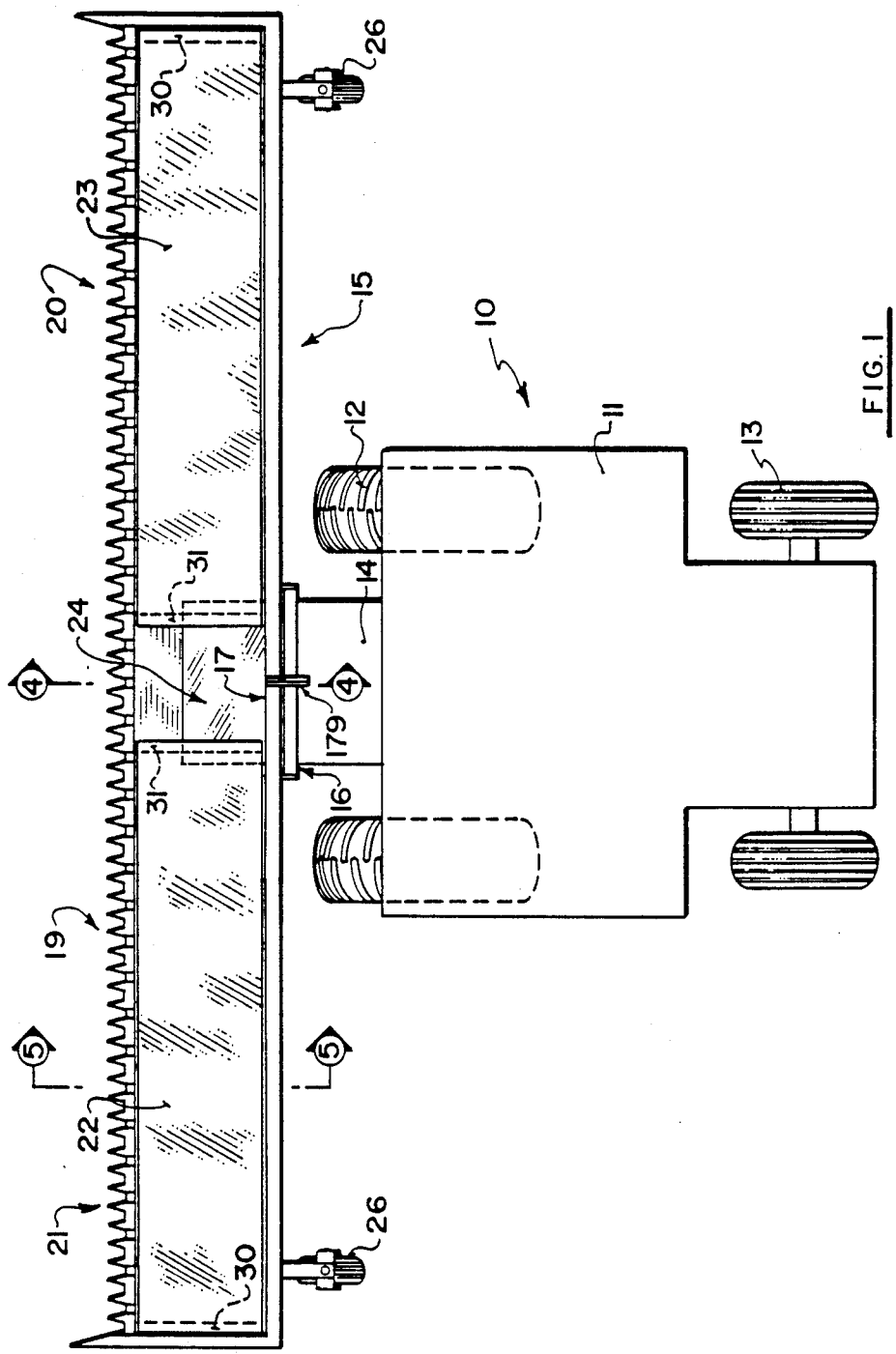
FIG. 1 is a top plan view of a combine harvester including a header according to the present invention.

In FIG. 1 a combine harvester is indicated generally at 10 and comprises a body 11 mounted on ground wheels 12 and 13 which are of conventional construction with the body including a conventional arrangement of beaters, sieves and the like for separating grain from straw and chaff. The body is fed by a feeder housing 14 which again is of conventional construction and in a conventional machine is built separately from a header indicated at 15 so that the combine 10 can be used with different types of header as required by a particular customer.

Thus the feeder housing 14 has attached thereto a front frame or mounting frame 16 to which a central frame portion 17 of the header 15 can be attached simply by suitable bolt or clamp arrangements.

The header comprises the central frame portion 17 which is connected to or integral with a pair of wing frame outer frame portions 19 and 20 which extend respectively out to sides of the combine. In some cases flexibility can be provided between the outer or wing frame portions and the central frame portion. In other cases, the whole unit may constitute a rigid elongate frame. A sickle knife arrangement 21 is mounted across a front edge of the frame portions to present a forwardmost cutting member for engaging and cutting the crop in conventional manner. Each of the wing frame portions 19 and 20 carries a draper assembly 22, 23 which is arranged immediately rearwardly of the sickle knife and movable to carry the cut crop along the wing portion transversely of the direction of motion toward the feeder housing 14. A further draper assembly 24 is positioned at the central frame portion and moves in a direction to transport the material from the ends of the drapers 22 and 23 rearwardly into the feeder housing 14 through an opening therein of conventional construction.

Figure 2:
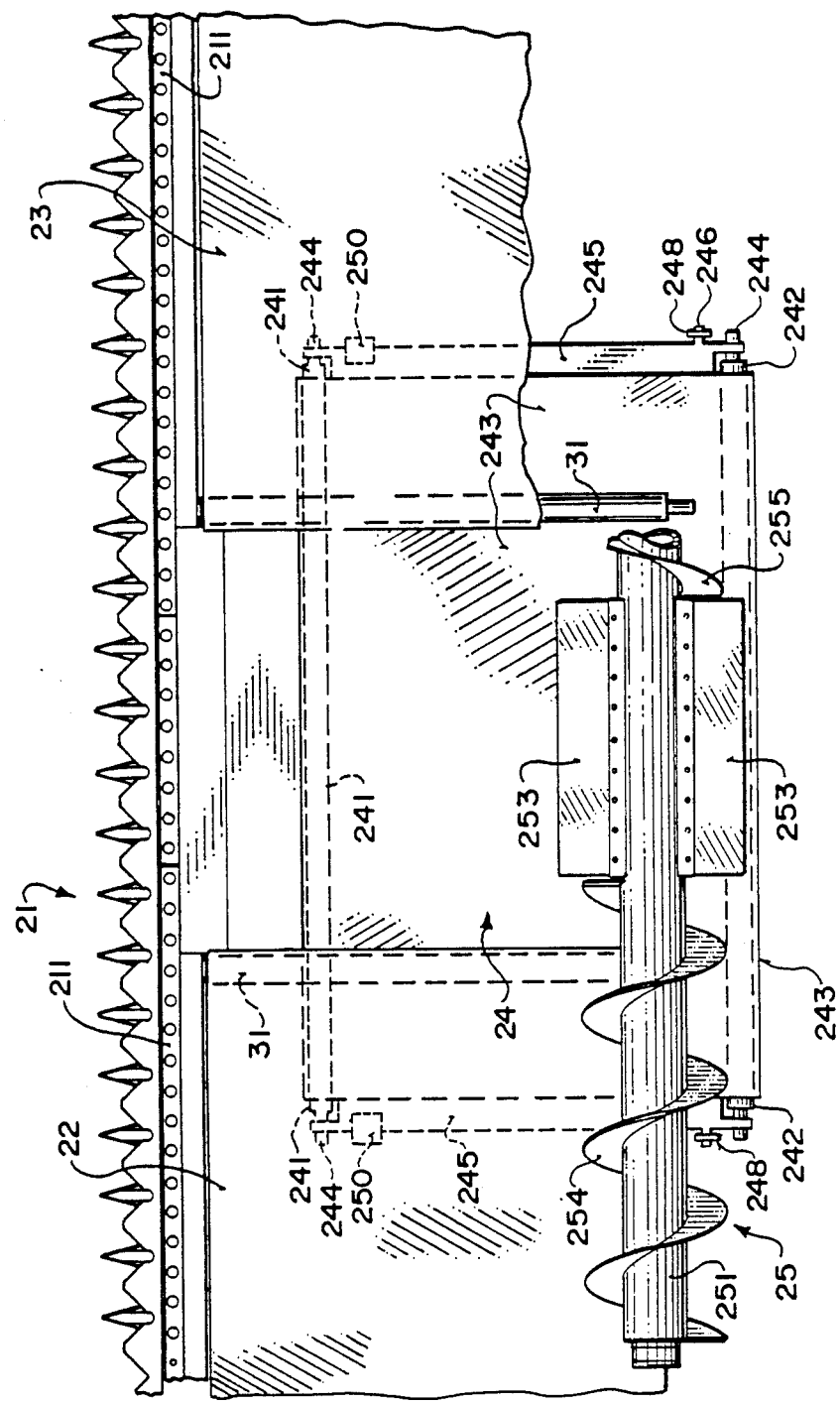
FIG. 2 is a top pan view of a central portion of the header of FIG. 1 on an enlarged scale.
Figure 3:
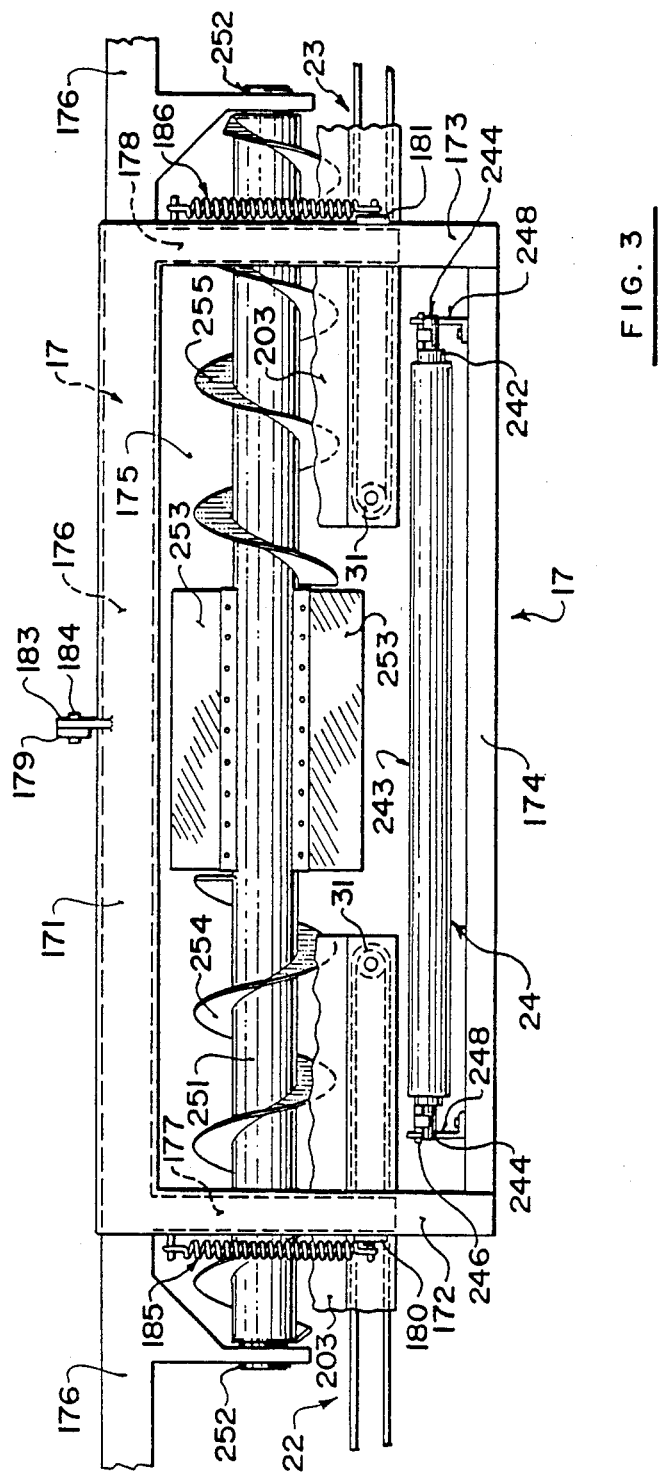
FIG. 3 is a rear elevational view of the portion of the header of FIG. 2.
Figure 4:
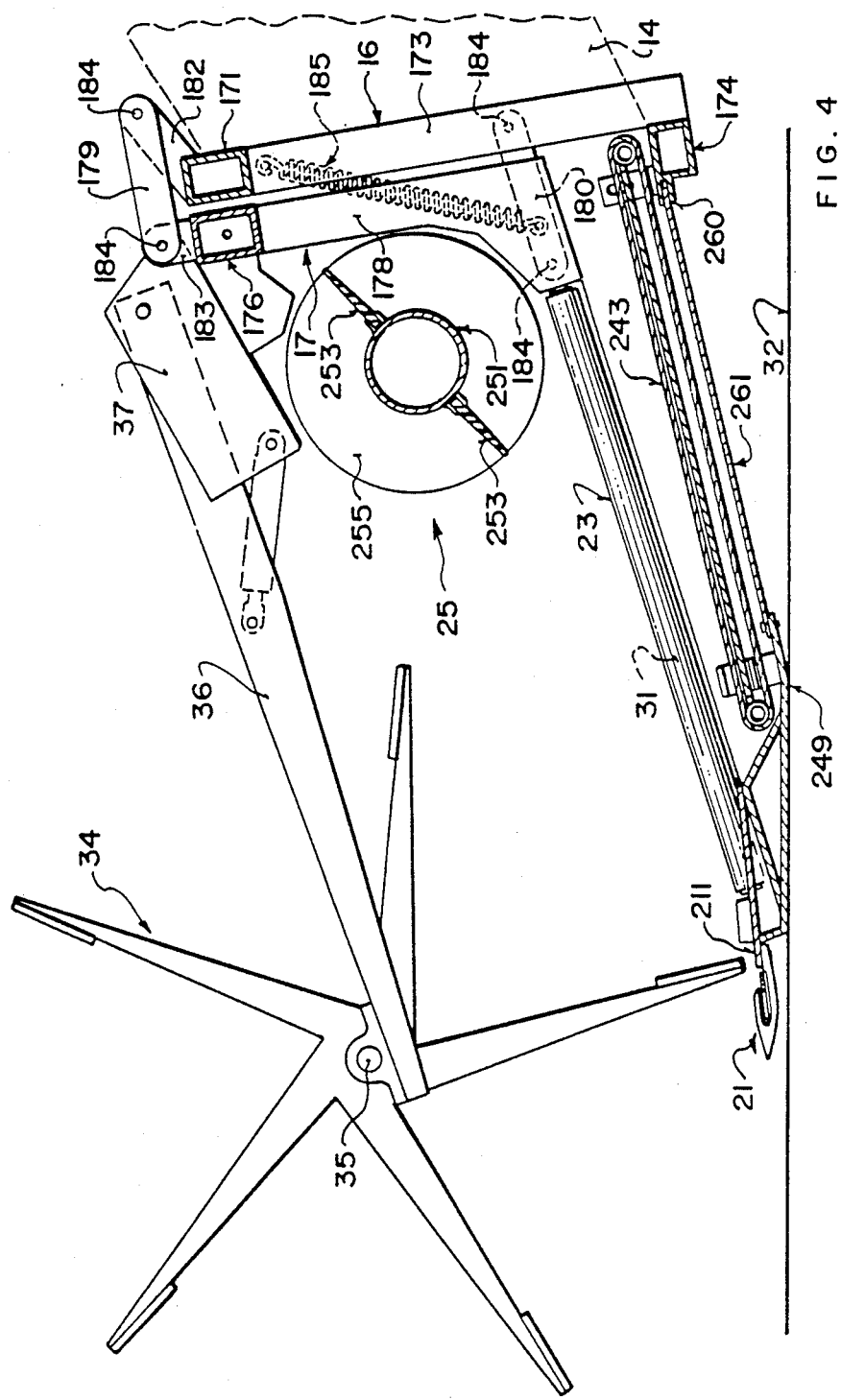
FIG. 4 is a cross sectional view along the lines 4—4 of FIG. 1.

Turning now to FIG. 2, 3 and 4, the construction of the header at the central frame is shown on larger scale and in more detail. The mounting frame 16 comprises a transverse upper beam 171, a pair of vertical beams 172, 173 and a transverse lower beam 174 thus defining therebetween an opening 175 through which material to be fed can pass to the feeder housing 14 of the combine.

The header frame 17 comprises a rectangular frame including a transverse upper beam 176 which is an elongate beam constituting the main support beam for the header thus extending across the full width of the header and acting to support the components of the header in conventional manner. From the beam 176 extend downwardly a pair of vertical support struts 177 and 178 which are arranged adjacent to the vertical beams 172, 173 of the frame 16.

The header frame 17 is mounted upon the front frame 16 by three pivotal braces 179, 180 and 181. The brace 179 is attached to an upstanding bracket 182 which is attached to the transverse beam 171 and extends rearwardly and upwardly therefrom to a position behind the mounting frame. The brace 179 extends forwardly therefrom and attached to a bracket 183 mounted upon the beam 176. The brace 179 is mounted substantially centrally of the frame at the upper edge and the braces 180 and 181 are mounted on either side of the frame 16 extending forwardly therefrom and coupled to a respective one of the struts 177, 178 of the frame 17. Pivotal movement of each of the braces is provided relative to its coupling on the respective strut by pivot pins 184. The braces thus provide vertical movement of the header frame relative to the mounting frame 16. The pivot pins of the braces are either rubber mounted or crowned to allow some rotational movement thus allowing limited twisting movement of the header frame about an axis approximating the centre of the front frame 16 and extending forwardly therefrom so that either end of the header can be lifted to a limited degree to accommodate changes in ground level. The header frame 17 is maintained biased upwardly against its weight by a pair of springs 185 and 186 which interconnect an upper part of the frame 16 to a forward position on each of the braces 180, 181.

The brace and spring arrangement shown is only one example of many different mounting techniques which can be used. As the details of this part of the device do not constitute an important feature of the invention, the device shown is illustrated only schematically and it will be within the knowledge of one skilled in the art to provide a detailed device of this or a similar type.

Turning now to FIG. 6, the draper assembly 24 comprises a pair of rollers 241, 242 with the axes of the rollers arranged transverse to the working direction of the header so that a draper canvas 243 carried by the rollers has an upper run which moves rearwardly toward the opening 175. The rollers 241 and 242 are mounted with their respective shafts 244 carried at respective ends of a plate support 245 which extends between the upper and lower runs of the draper canvas so as to provide a backing support surface for the upper run of the canvas. The shafts 244 are mounted on the plate support 245 fixed against movement. However the plate itself is mounted at a rearward end by pins 246 (only one visible) each movable within a vertical slot 247 of a respective pair of vertical plates 248 carried on the mounting frame for limited vertical movement of the plate 245 and thus the shaft 244 and therefore the roller 242 relative to the transverse beam 174 of the mounting frame.

Figure 5:
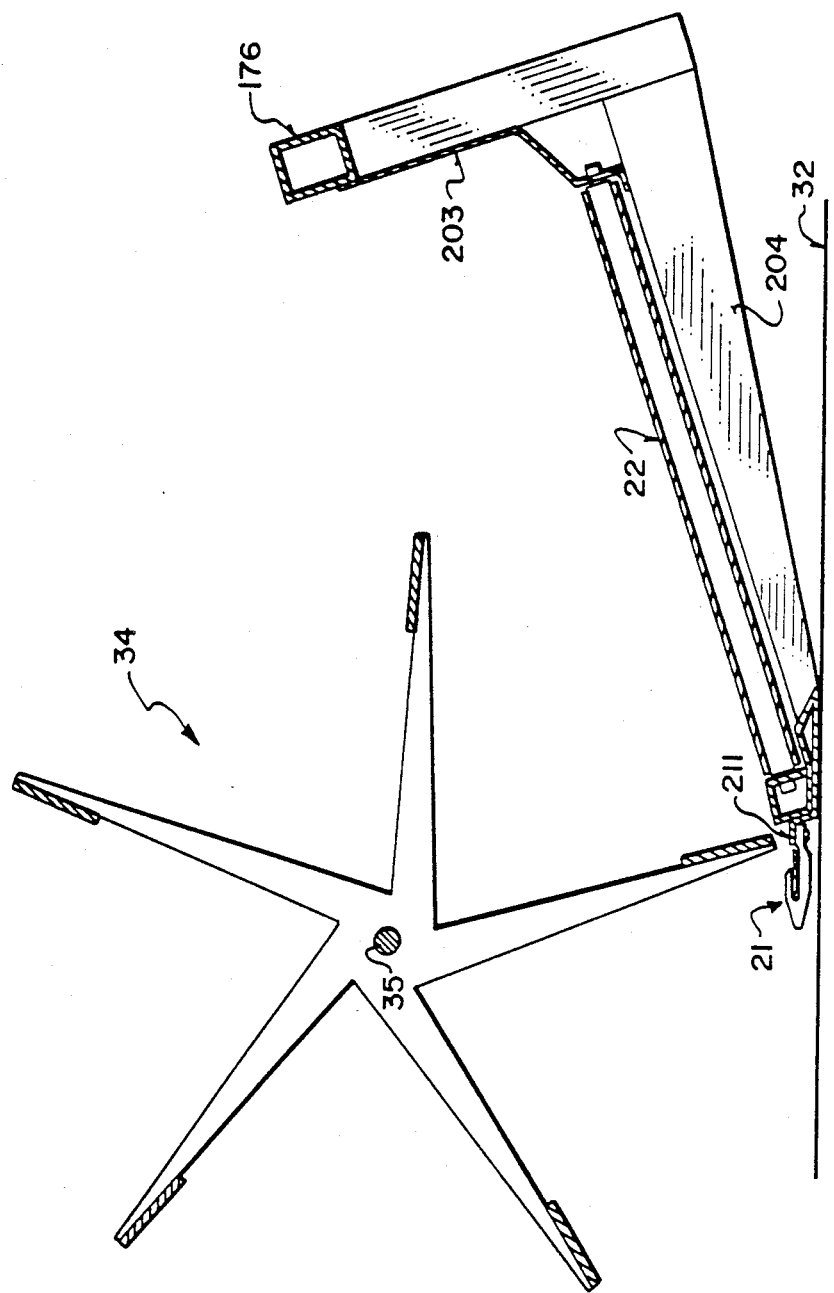
FIG. 5 is a cross sectional view along the lines 5—5 of FIG. 1.

The roller 241 is mounted at a forward end of the plate 245 carried on the header frame at a portion thereof indicated at 249 which is rigidly coupled to and supported by the beam 176 by the conventional forwardly extending struts 204 shown in FIG. 5. The frame portion 249 thus is moveable with the header frame 17 relative to the front frame 16 and particularly the lower transverse beam 174 on which the roller 242 is mounted. The forward end of the plate 245 and thus the roller 241 is mounted on the frame portion 249 in a similar manner to the mounting of the roller 242 allowing vertical movement of the other relative to the frame portion 249.

In this case, the plate 245 is constrained for limited vertical movement by two horizontal plates 250 which confine an edge of the plate 245. This mounting arrangment allows both the limited vertical movement required and a horizontal sliding movement necessary to accommodate changes in distance between the frame members 174 and 249 caused by the movement of the header frame. The tension of the draper canvas is maintained by the fixed spacing of the rollers 241 and 242 carried on the plate 245.

Interconnecting a rearward edge 251 of the frame portion, 249 and a forward edge 260 of the transverse beam 174 is a pan 261 which underlies the canvas 243 to prevent the escape of grain from the header in that area. The pan is a flat sheet of steel of thin gauge.

A forward edge of the pan as shown in FIG. 6 is attached rigidly by bolts 262 to the beam 249. A trailing edge of the pan is mounted for sliding movement between an underside of the edge 260 and an upper surface of a plate 263 defining with the forward edge 260 a channel which engages around the trailing edge pan so that the pan edge can slide in a direction longitudinal to the pan to take up changes in the distance between the frame members 249 and 174 caused by the pivotal and lifting movement of the header frame.

The pan is formed of a thin sheet of a suitable gauge metal of sufficient strength that it does not droop under its weight or the weight of material upon it. It also is sufficiently flexible that it can flex about axes generally longitudinal to the working direction to accommodate the twisting movements of the header frame. For this reason, the pan must be free of rigid support elements in a transverse direction but may include longitudinal support element along the sides. Such may comprise merely a folded edge as shown at 264, or may comprise tubular struts (not shown) which can provide rear to front thrust to propel a forward edge of the header.

The pan thus acts to seal the area between the header and the front of the opening 175 at the lower surface to prevent material falling from the header. Material to the sides and above the opening 175 is suitably confined by the transporting arrangements described.

The roller 241 is arranged spaced rearwardly of the sickle knife arrangement 21 and particularly rearwardly of the bar 211 which supports the sicle knife and is of conventionally construction.

The central frame 17 also carries a roller member 25 which is omitted from the illustration of FIG. 1 for convenience but is shown clearly in FIGS. 2, 3 and 4. The roller member 25 comprises the shaft 251 which is rotatably mounted in bearings 252 carried by the frame 17 on suitable supports. The shaft 251 may have at a central section thereof extending over only a part of the length thereof a paddle section defined by a pair of flexible paddle members 253 which are mounted in an axial plane of the shaft 251 and are spaced angularly by 180°. Outwardly of the paddle section is arranged a pair of auger screw flights 254, 255 which are angled so as to cause an inward movement on rotation of the shaft 251 in an anticlockwise direction as viewed in FIG. 4 so that it will be appreciated therefore that the roller member 25 and the draper 24 cooperate in their rotation to tend to feed material rearwardly from the central frame portion through the opening 175 into the feeder housing 14 of the combine. In particular, the paddle blades 253 act at the very centre of the opening to bat or paddle the material rearwardly thus tending to confine it toward the draper 24 so that it can properly pass through the opening in the feeder housing, which as previously explained is generally smaller than the opening 175 in the frame.

The auger sections 254 and 255 tend to move material toward the paddle section so as again to confine the material and direct it inwardly and downwardly for cooperation with the draper 24 through the opening into the feeder housing.

The header frame including the central portion and the wing portions 20 and 21 comprises the upper tubular frame member 176 and a rear sheet 203 best shown in FIG. 5 but omitted for convenience in FIG. 3 which extend outwardly from the central frame to a remote outer end of the wing frame section. The vertical support struts two of which are shown at 177 and 178 are attached to the lower channel structure section 204 which extends forwardly and carries the sickle knife bar 211. At the centre of the wing frame portions, there is provided the frame members 249 for supporting the ends of the roller 214.

Adjacent the outer end of each of the wing sections is mounted a gauge wheel 26. The springs 185, 186 are arranged to have sufficient spring force so that only a small proportions of the weight of the wing section rests upon the gauge wheel 26 so that the gauge wheel can run over the ground and can readily raise and lower the wing section in dependence upon the height of the ground relative to frame 16.

The gauge wheel 26 can themselves be spring mounted so that the header is softly suspended and floating in its action to ground level changes.

Each of the wing sections carries a pair of rollers 30 and 31 with the rollers 31 positioned at an innermost end of the wing sections and the rollers 30 at an outermost end for receiving and moving a draper canvas 22, 23. The draper canvas is positioned immediately rearward of the bar 211 so that any cut crop drops from the knife directly onto the canvas for moving in parallel fashion transversely along the frame toward the draper 24. The rollers 31 as shown in FIG. 3 are mounted on the rear sheet 203 as best shown in FIG. 5.

As best shown in FIG. 4, the roller 31 is positioned immediately rearwardly of and mounted upon the bar 211 and extends rearwardly therefrom to a rear edge of the wing section adjacent the lower tube 174. The angle of the upper surface of the draper 23 is of the order of 18° relative to the intended ground direction or horizontal which is a sufficiently small angle to allow the crop to fall properly onto the draper and be carried thereby in parallel aligned relationship. A significantly increased angle of the draper tends to reduce the effectiveness of the transport of the crop so that it can bunch up and plug the machine by failure to remain in the proper parallel orientation. In addition it will be noted from FIGS. 4 and 5 that the draper is positioned at its forward end as close to the ground as possible and immediately rearward of the bar 211 so that there is very little or no step behind the sickle knife before the crop falls onto the draper. Thus with the sickle knife closely adjacent the ground indicated at 32, the forwardmost edge of the lower run almost contacts the ground and is spaced therefrom solely by the thickness of the pan extending beneath the draper.

The forward roller 241 of the draper 24 is spaced rearwardly from the bar 211 by a sufficient distance that it can extend beneath the lower run of the drapers 22 and 23 and specifically beneath the innermost rollers 31 thereof. Such a distance may be of the order of 9 inches to 18 inches and provides a condition in which the outer edges of the draper 24 lie underneath the lower run of the drapers 22 and 23. This prevents materials from wrapping the drapers 22 and 23 and jamming between the drapers 22, 23 and the draper 24. Furthermore this jamming is inhibited by the fact that the angle of the draper 24 to the horizontal is slightly less than the angle of the drapers 22 and 23 so that the gap between the upper run of the draper 24 and the lower run of the drapers 22 and 23 gradually increases as it approaches the opening 175.

The reel generally indicated at 34 is omitted from FIGS. 1, 2 and 3 for convenience of illustration but is shown in FIGS. 4 and 5. The reel includes a support shaft 35 on which is mounted a plurality of bats by suitable support fins. The reel may be of conventional construction or may be of the type illustrated and claimed in co-pending Canadian Application No. 492,755 filed Oct. 10, 1985 and corresponding to U.S. application Ser. No. 788,335 filed Oct. 17, 1985, both assigned to the assignees of the present application.

The arrangement in which the roller 242 and the rear edge of the pan 261 are mounted upon the front frame 16 of the feeder housing 14 while the front roller 241 and the front edge of pan 261 are mounted upon the header frame allows the canvas 243 to properly control the feed of the material into the feeder housing while twisting movement of the header relative to the front frame 16 is taken up by twisting of the draper canvas and the sealing pan. This allows a rigid one piece header to follow the ground or float laterally with respect to the feeder housing and thus with respect to the propelling vehicle. As explained previously the mounting of the header by way of the pivotal braces allows a limited degree of floating movement both in a twisting direction and in a lifting direction and this is taken up by flexing of the canvas 243 and the sealing pan 261. As the rear end of the canvas and the sealing pan remain properly positioned relative to the feeder housing, it is ensured that the feed of the material into the feeder housing is maintained without any openings which vary in dependence upon the movement of the header.

In addition the mounting of the rollers 241 and 242 in the mounting brackets which allow a limited vertical movement of each of the rollers allows problems in feeding of the material to be overcome. Generally, the weight of the rollers and the canvas and support plate hold the rollers at the bottom limit of the slot mountings. However, in some cases material tends to backfeed under the draper canvas and could, if the canvas were rigidly mounted, wedge between the draper canvas and the pan. Allowing the draper on the rollers to float vertically in this manner prevents draper stoppage and allows its to clear this obstruction. In this way materials which would otherwise become wedged underneath the draper canvas merely causes a slight lifting movement of the draper canvas while the material tends to be fed forwardly relative to the machine direction to pass around the front roller 241 to rejoin material passing across the upper run of the canvas 243. While both of the rollers 241 and 242 are mounted for the limited vertical movement at both ends thereof, in some cases mounting of only one of the rollers in this manner is necessary or mounting of only one end of the roller for vertical movement may also achieve the same result.

Turning now to FIG. 7, there is shown an alternative arrangement employing on the combine a conventional auger-type header. In FIG. 7 the feeder housing is indicated at 1 including a feeder chain 1A for transporting the crop in the direction of the arrow 1B. The feeder housing can be raised and lowered by a linkage indicated at 1C pivotally coupled to a bracket 1D at a lower edge of the feeder housing.

On a front face of the feeder housing is provided a mounting frame 1E which includes a lug 1F shown schematically as carried out on the upper surface of the feeder housing.

The header indicated at 2 comprises a conventional feed auger 3, a reel 4 and a cutter bar 5 and is attached to feeder housing 1 by way of two upper links 6 and two lower links 7. The upper links 6 are arranged on either side of the feeder housing with rear pivot points mounted on the lugs 1F of the feeder housing and front pivot points mounted on the header frame at an upper beam 2A thereof. The lower links 7 have rear pivot points mounted on the mounting frame 1E at a lower beam thereof and front pivot points attached to the header frame at pivot couplings 7A.

A pan 8 is provided which follows substantially the line of the lower links 7 and connects from a beam at the pivot coupling 7A of the header 2 to the beam at the lower portion of the mounting frame 1E.

The pan is substantially as shown in FIG. 6 in that the pan is coupled between a fixed mounting at one edge and a sliding coupling at the other edge. In this case as the material is moving rearwardly across the pan, it is necessary to ensure that the pan at the rear edge thereof lies on top of the surface to which it is attached. This can be achieved by bolting the pan on the top surface and sliding the forward edge thereof. Alternatively the forward edge can be bolted and the rear edge can slide on top of the surface of the frame element to which it is engaged. In place of the slot type confinement shown in FIG. 6, it is possible to confine the trailing edge of the pan merely by slightly bowing the pan so that its own spring tension causes the trailing edge to be pressed downwardly onto the surface on which it slides.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A header for a combine harvesting machine comprising a header frame, a mounting frame including means for mounting the mounting frame fixedly on the machine for transportation of the header frame in a working direction across a field including a standing crop to be harvested, said header frame including ends thereof extending outwardly to respective sides of the mounting frame, means mounting said header frame on said mounting frame for limited vertical movement of the header frame relative to the mounting frame and limited pivotal movement of the header frame relative to the mounting frame about an axis generally parallel to the working direction such that each end of the header frame can be lifted independently of movement of the other end of the header frame, a knife arrangement extending transversely across a front edge of the header frame for cutting the standing crop, means defining a feed opening of the mounting frame through which the cut crop is guided to pass, means for transporting said cut crop inwardly from the ends of the header frame and for feeding said cut crop through said feed opening, said mounting frame including a mounting frame member fixed relative to the mounting frame and defining an edge extending across the mounting frame in front of the feed opening adjacent a lower edge of the feed opening, said header frame including a header frame member fixed relative to the header frame and defining an edge extending partly along the header frame rearwardly of said knife arrangement and substantially parallel to the edge of the mounting frame member leaving an opening between the edge of the mounting frame member and the edge of the header frame member which opening varies in dimension as the header frame moves relative to the mounting frame, a flexible pan member arranged underneath said transporting means with a forward end thereof in engagement with said header frame member at a position rearwardly of said knife arrangement and a rearward end thereof in engagement with said mounting frame member, said vertical movement and pivotal movement of said header frame being accommodated by flexing of said pan member, means attaching the respective end of said flexible pan member to one of said header frame member and said mounting frame member, and contact maintaining means maintaining the respective end of the flexible pan member substantially continually in contact with the other of said header frame member and mounting frame member during said vertical movement and pivotal movement of said header frame so as to form a bridge across said opening between the edge of the header frame member and the edge of the mounting frame member.

2. The invention according to claim 1 wherein said means mounting said header frame on said mounting frame comprises a plurality of pivotal brace members each pivotally connected to the header frame and to the mounting frame, and spring means connected to said header frame and to said mounting frame and arranged to bias the header frame upwardly against its weight.

3. The invention according to claim 1 wherein said contact maintaining means is arranged to allow sliding movement of said pan member on said other of said header frame member and said mounting frame member in a direction longitudinal of said working direction.

4. The invention according to claim 1 wherein said pan member is formed of a sheet material.

5. The invention according to claim 1 wherein said pan member has sufficient strength to be self supporting between said header frame and said mounting frame substantially without drooping.

6. The invention according to claim 3 including means for restricting movement of said pan member relative to said other of said header frame member and said mounting frame member to said sliding movement.

7. The invention according to claim 1 wherein said means for transporting comprises a first and a second draper assembly each mounted on said header frame and including a pair of draper guide rollers arranged with the respective axis of rotation extending generally parallel to the working direction, one of said rollers being spaced from the opening to a respective side thereof and the other of said rollers being arranged adjacent said opening to define an end of the draper assembly, and a draper canvas arranged rearwardly of said knife arrangement so as to receive the cut crop therefrom and constrained by the rollers to move transversely of the frame toward said end to carry crop toward said feed opening, a third draper assembly including a front draper guide roller and a rear draper guide roller with respective axes thereof extending transversely to said working direction and a third draper canvas mounted on said front and rear guide rollers and arranged rearwardly of said knife arrangement and at said ends of the first and second draper assemblies so as to carry said cut crop rearwardly of the frame from said ends to said feed opening to pass therethrough.

8. The invention according to claim 7 wherein said pan member is arranged underneath said third draper assembly so as to have an upper surface parallel to and adjacent to a lower run of said third draper canvas, and means mounting at least one of said front and rear draper guide rollers for limited movement thereof together with said third draper canvas carried thereby in a direction away from and toward said pan member.

9. The invention according to claim 8 wherein said third draper assembly is biased to a lower most position thereof and is movable against said bias away from said pan member.

10. The invention according to claim 9 wherein said third draper assembly is biased solely by the weight thereof.

11. The invention according to claim 8 wherein both said front and rear rollers have ends thereof mounted in slide supports to allow said movement of both of said rollers and said third draper canvas carried thereby.

12. The invention according to claim 7 wherein said front draper guide roller is mounted on said header frame and wherein said rear draper guide roller is mounted on said mounting frame and wherein said vertical movement and said pivotal movement is accommodated by twisting of said third draper canvas.

13. The invention according to claim 7 including a confining and feeding member having a longitudinal axis transverse to said working direction and extending from a first end spaced inwardly from an outer end of said first draper canvas and a second end spaced inwardly from an outer end of said second draper canvas, means mounting said confining member in spaced position above a rear end of said third draper assembly and means driving said confining member to rotate about said axis in a direction to feed material thereunder so as to cooperate with said third draper assembly to confine said cut crop between an underside of said confining member and an upper surface of said rear end of said third draper assembly to direct said cut crop to pass through said feed opening.

14. A header for a combine harvesting machine comprising a header frame, a mounting frame including means for mounting the mounting frame fixedly on the machine for transportation of the header frame in a working direction across a field including a standing crop to be harvested, said header frame including ends thereof extending outwardly to respective sides of the mounting frame, means mounting said header frame on said mounting frame for limited vertical movement of the header frame relative to the mounting frame and limited pivotal movement of the header frame relative to the mounting frame about an axis generally parallel to the working direction such that each end of the header frame can be lifted independently of movement of the other end of the header frame, a knife arrangement extending transversely across a front edge of the header frame for cutting the standing crop, means defining a feed opening of the mounting frame through which the cut drop is guided to pass, means for transporting said cut drop inwardly from the ends of the header frame and for feeding said cut crop through said feed opening, a flexible pan member arranged underneath said tranporting means with a forward end thereof in engagement with said header frame at a position rearwardly of said knife arrangement and a rearward end thereof in engagement with said mounting frame, said vertical movement and pivotal movement of said header frame being accommodated by flexing of said pan member, means attaching one end of said flexible pan member to one of said header frame and said mounting frame, and means engaging an opposed end of the flexible pan member with the other of said header frame member and mounting frame member and said engaging menas being arranged to allow sliding movement of said pan member relative to said other of said header frame member and said mounting frame member in a direction longitudinal of said working direction.

15. The invention according to claim 14 wherein said pan member is formed of a sheet material.

16. The invention according to claim 14 wherein said pan member has sufficient strength to be self supporting between said header frame and said mounting frame substantially without drooping.

17. The invention according to claim 14 including means for restricting movement of said pan member relative to said other of said header frame member and said mounting frame member to said sliding movement.

18. The invention according to claim 14 wherein said means for transporting comprises a first and a second draper assembly each mounted on said header frame and including a pair of draper guide rollers arranged with the respective axis of rotation extending generally parallel to the working direction, one of said rollers being spaced from the opening to a respective side thereof and the other of said rollers being arranged adjacent said opening to define an end of the draper assembly, and a draper canvas arranged rearwardly of said knife arrangement so as to receive the cut crop therefrom and constrained by the rollers to move transversely of the frame toward said end to carry crop toward said feed opening, a third draper assembly including a front draper guide roller and a rear draper guide roller with respective axes thereof extending transversely to said working direction and a third draper canvas mounted on said front and rear guide rollers and arranged rearwardly of said knife arrangement and at said ends of the first and second draper assemblies so as to carry said cut crop rearwardly of the frame from said ends to said opening to pass therethrough.

19. The invention according to claim 18 wherein said front draper guide roller is mounted on said header frame and wherein said rear draper guide roller is mounted on said mounting frame and wherein said vertical movement and said pivotal movement is accommodated by twisting of said third draper canvas.

20. The invention according to claim 18 including a confining and feeding member having a longitudinal axis transverse to said working direction and extending from a first end spaced inwardly from an outer end of said first draper canvas and a second end spaced inwardly from an outer end of said second draper canvas, means mounting said confining member in spaced position above a rear end of said third draper assembly and means driving said confining member to rotate about said axis in a direction to feed material thereunder so as to cooperate with said third draper assembly to confine said cut crop between an underside of said confining member and an upper surface of said rear end of said third draper assembly to direct said cut crop to pass through said feed opening.

* * * * *